Dec. 4, 1962 V. J. JOKELA 3,066,496
REFRIGERATION DEFROST CONTROL
Filed Nov. 23, 1960 2 Sheets-Sheet 1

INVENTOR.
VEIKKO J. JOKELA
BY Clyde C. Blinn
ATTORNEY

Dec. 4, 1962  V. J. JOKELA  3,066,496
REFRIGERATION DEFROST CONTROL
Filed Nov. 23, 1960  2 Sheets-Sheet 2

INVENTOR.
VEIKKO J. JOKELA
BY Clyde C. Blinn
ATTORNEY

United States Patent Office 3,066,496
Patented Dec. 4, 1962

3,066,496
REFRIGERATION DEFROST CONTROL
Veikko J. Jokela, Plymouth Village, Minn., assignor to Minneapolis-Honeywell Regulator Company, Minneapolis, Minn., a corporation of Delaware
Filed Nov. 23, 1960, Ser. No. 71,318
8 Claims. (Cl. 62—140)

The present invention is concerned with an improved defrost control for a heat exchange coil of a refrigeration system; in particular, the invention is concerned with a specific control apparatus which responds to the change in pressure developed by the restriction of air flow through a coil to operate a switch, but the operation of the switch is prevented when the temperature of the coil is above a frost developing temperature even though some adverse condition may produce a pressure change which normally starts a false defrost cycle.

In a refrigeration apparatus where an exchange of heat is provided by passing air through a refrigeration coil, the presence of frost on the coil to restrict the flow of air through the coil is a common problem. There have been many control devices used to initiate a defrost cycle or an operation to remove the frost from the coil once frost is formed in a sufficient amount to restrict the heat transfer from the air. The use of a pressure responsive device to respond to the air pressure drop across the coil, which is indicative of the air flow through the coil, for initiating the defrost cycle is old. The use of a temperature responsive device to terminate the defrost operation once initiated by an air pressure responsive device is also old.

In order to prevent false defrost operations as a result of changes in air pressure which could be caused by a gust of wind through the coil or some other adverse condition to produce a pressure change, a more recent system has been proposed. The system makes use of the temperature responsive device to prevent the initiation of the defrost cycle by an air pressure responsive device when the temperature of the coil is such that frost could not form. Once the coil temperature drops to a temperature at which frost could occur, the defrost cycle can be brought about by the air pressure responsive device.

The present invention is a specific apparatus for accomplishing the broader concept which has been heretofore recognized. The present invention provides a pressure responsive device for controlling a switch actuating member with improved repeatability. The switch actuating member is held in a first operating range by a temperature responsive device when the coil temperature is above a predetermined value. When allowed to move to a second range, the switch member actuates a switch to start the defrost cycle. When the coil temperature drops below the predetermined value at which frost could form on the coil, the pressure responsive device alone is capable of holding the switch actuating lever in the first operating range.

An object of the present invention is to provide an improved defrost control for a refrigeration heat exchanger; specifically, the improvement lies in the various features which make the control inexpensive and easy to manufacture.

Another object of the present invention is to provide a refrigeration apparatus defrost control which has very good repeatability in its operation to prevent unnecessary shut down of the refrigeration apparatus.

These and other objects of the present invention will become apparent upon a study of the specification and drawings of which:

Figure 1:
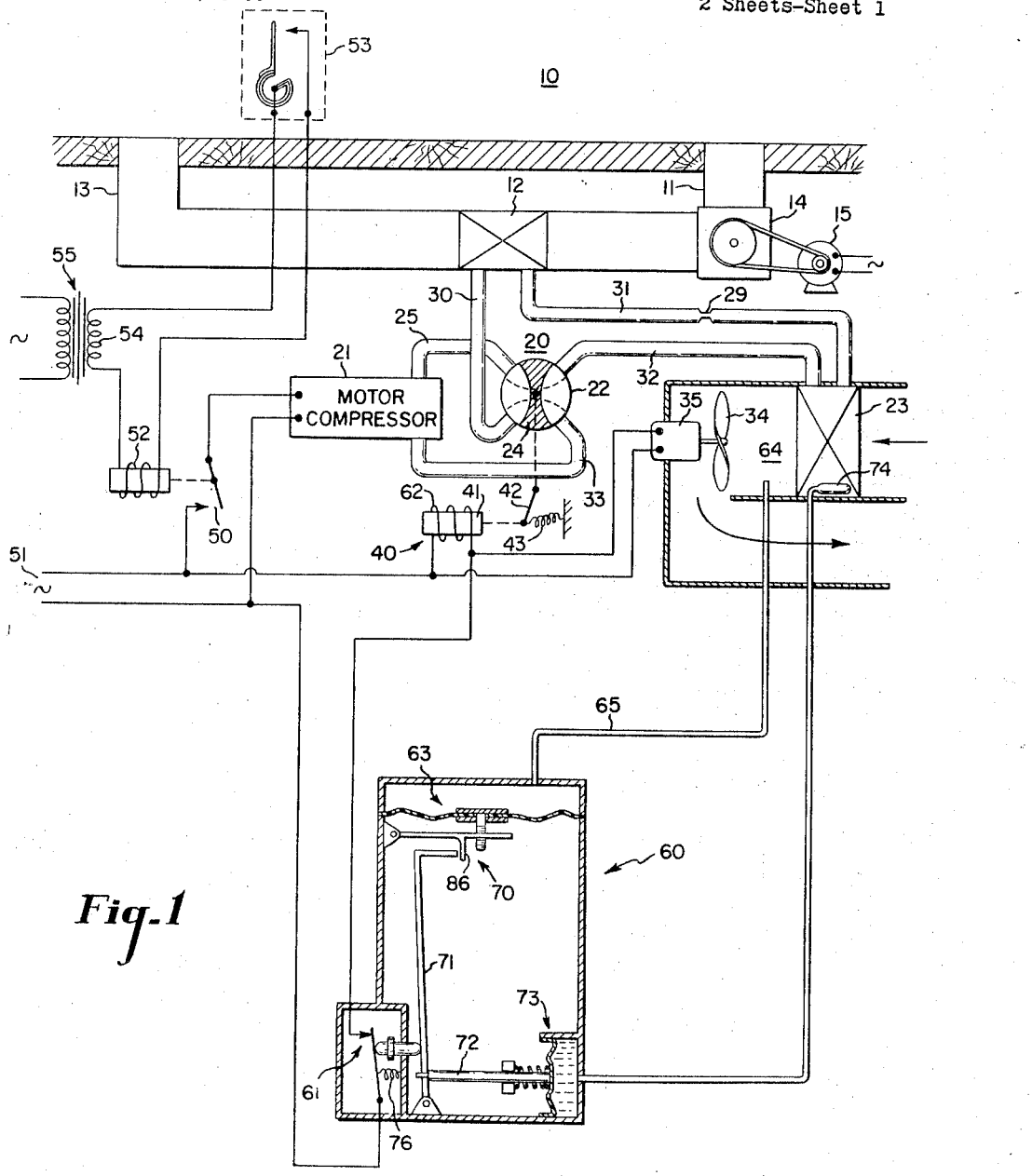
FIGURE 1 is a schematic representation of a heating installation in which an outdoor air coil is used to obtain heat from the outdoor air and a defrost control is used to initiate a defrost cycle when the outdoor coil becomes restricted by frost.

Referring to FIGURE 1, a heating system is shown for delivering heated air to a space 10. The air flows into a return duct 11 and through a heat exchanger or coil 12 to be delivered into a space from a supply duct 13. The air flow is provided by a fan 14 driven by a conventional motor 15. Connected to heat exchanger 12 is a conventional refrigeration system 20. A motor compressor 21 is connected by means of a changeover valve 22 to coil 12 and an outdoor heat exchanger or coil 23 by a network of conduits or pipes described as follows. With movable member 24 of changeover valve 22 in a position as shown, the refrigerant flow from the motor compressor is through a conduit 25, to valve 22, through a conduit 30, heat exchanger 12, through a conduit 31 having a restriction 29, heat exchanger 23, through a conduit 32, valve 22 and back to compressor through a conduit 33. With such a connection, coil 12 is the hot coil or condenser, and heat is delivered to the air passing through coil 12. Coil 23 is the evaporator and heat is removed from the outdoor air passing through coil 23 under the power of fan 34 which is driven by a motor 35. Upon the deenergization of a solenoid 40, member 24 of valve 22 moves to a horizontal position which is shown in dotted lines to reconnect the refrigeration system so coil 23 is the hot coil or condenser. The second mentioned type of operation with the solenoid deenergized is used for defrosting outdoor coil 23. A movable member 41 of solenoid 40 is connected to a lever 42 which moves member 24 in the position as shown when the solenoid is energized. The second mentioned position of member 24 is obtained upon a return of lever 42 to a nonenergized position by spring 43.

Motor compressor 21 is energized when the switch 50 is closed to connect the motor compressor to a source of power 51. Switch 50 is closed when the energization winding 52 of a solenoid is energized by the closing of a thermostat 53, which is located in space 10, by a circuit as follows: from a secondary winding 54 of a source of power 55, thermostat 53, winding 52 of the solenoid, and back to the secondary 54.

A defrost control 60 which is shown schematically to show the broad concept of the prior art has a switch 61 which is connected in the energization circuit of solenoid 40 by a circuit traced as follows: from the source of power 51, winding 62 of solenoid 40, switch 61, and back to the source of power 51. The defrost control has a pressure responsive portion 63 which responds to the pressure in the upstream area 64 of coil 23 by an air tube 65. Tube 65 provides a restriction to prevent sudden changes in pressure from affecting the pressure responsive portion. A latching apparatus 70 is actuated by pressure responsive device 63 to allow a lever 71 to move clockwise to open switch 61. Lever 71 is held in a counter clockwise position by the output member 72 of a temperature responsive device 73. The temperature responsive device has a remote bulb 74 which is mounted on coil 23. As long as the coil temperature as sensed by bulb 74 is above the temperature at which frost would form on coil 23, member 72 holds lever 61 to the left to maintain switch 62 closed. If the temperature of the coil 23 drops below the temperature at which frost will develop on the coil, member 72 moves to the right to allow lever 71 to be held in position by the latching mechanism 70. Upon the presence of frost on coil 23, a vacuum is produced in area 64 to cause latch mechanism 70 to allow lever 71 to move to the right and open switch 61 which initiates the defrost cycle. Other fan constructions, such as a blow through fan design, are apparent; however, the intent is to provide a pressure responsive device to measure the presence of a reduction of air flow through coil 23.

The defrost cycle is started by the operation of valve 22 when solenoid 40 is deenergized to make coil 23 the hot or the condensing coil. As coil 23 increases in temperature, the temperature of bulb 74 increases and output member 72 moves lever 71 to the left against the loading on the operating button of the switch as provided by a spring 76. The defrost control is then reset to be in a position to respond to the need for another defrost cycle.

Figure 2:
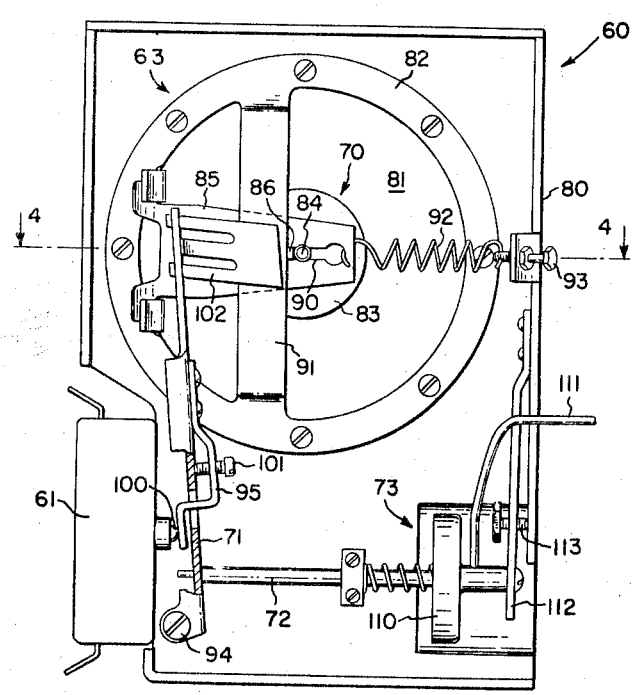
FIGURE 2 is a front view of the specific defrost control shown in schematic form in FIGURE 1.

Referring to FIGURE 2, a specific improved defrost control 60 is shown. A base 80 has a pressure responsive device 63 which comprises a flexible diaphragm 81 sealed to the base at its periphery by a ring 82 which is screwed to the base. Base 80 has a relatively air tight cover 86 which prevents sudden changes in the ambient air pressure outside the base and cover assembly from affecting pressure responsive portion 63. A movable member 83 is attached to the center of diaphragm 81. Projecting from the center of the movable member is a bolt or member 84. A hinged member 85 pivotally connected to the base or ring 82 at its left hand extremity is connected to the bolt 84 by wedging the bolt 84 into a slot 90 provided on the right hand end of hinged member 85. A portion of member 85 adjacent the bolt is bent forward to form a stop 86. A platform or horizontal portion 91 of ring 82 spans the diaphragm 81. Hinged member 85 is biased outward against the under side of platform 91 by the force of a spring 92 connected between the right hand extremity of hinged member 85 and an adjustable screw 93 attached to the right hand side of the base.

Lever 71 is pivotally supported at the lower extremity of base 80 on a shaft or bolt 94 so the lever is able to move in a plane parallel to the base through first and second ranges which will be later defined. Lever 71 has a second lever 95 connected thereto which engages an operating button 100 of switch 61. The relative positions of lever 95 and lever 71 can be adjusted for calibration purposes by a screw 101. Lever 95 also provides a strain release. The upper end of lever 71 has a flat, knife-like, blade 102 connected thereto. Blade 102 which is made of resilient material is biased against platform 91 so the blade slides against platform 91 as the lever 71 moves from the far extreme left hand position as shown to the right.

Temperature responsive apparatus 73 comprises a liquid filled system which is made up of an operator 110 connected to a remote bulb 74 (not shown) by a capillary tube 111. The operator 110 is mounted on a lever 112 which is attached to the base, and the position of the lever 112 with respect to the base can be adjusted by a screw 113 for temperature calibration purposes. Output member 72 of operator 110 engages the lower portion of lever 71. When the temperature of bulb 74 is above 32° F. or above the temperature at which frost will not form on the coil, member 72 holds lever 71 in the first range or the position as shown to maintain switch 61 closed. As the temperature of bulb 74 decreases below 32°, member 72 moves to the right to allow lever 71 to move clockwise. Blade 102 would engage stop 86 to hold the lever from moving to the far right extremity or in the first operating range.

Figure 3:
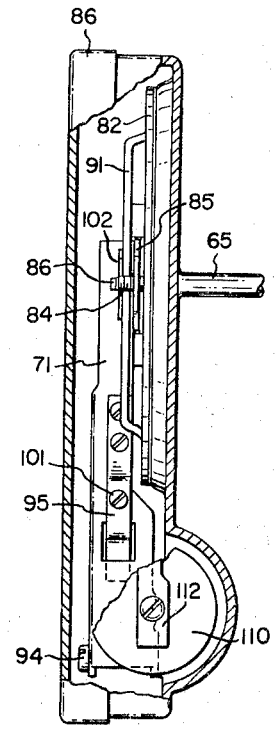
FIGURE 3 is a side view of the control device of FIGURE 2.

If a partial vacuum was developed on the under side of diaphragm 81 through conduit 65 as shown in FIGURE 3, stop 86 as shown in FIGURE 2, would move inward to allow blade 102 and lever 71 to move to the right and to the second operating range. Whenever lever 71 is in the second operating range, switch 61 is opened to initiate the defrost cycle as previously mentioned. The defrost cycle would then cause the temperature of bulb 74 (not shown) connected to temperature responsive apparatus 73 to increase in temperature, and member 72 would move to the left to move the lever 71 into the first operating range or a position as shown. Lever 95 provides a strain release besides a calibration means. When member 72 pushed lever 71 counter clockwise so member 95 moves button 100 inward, member 95 is movable with respect to lever 71. When button 100 is moved to an extreme inward position, any damage upon further movement of member 72 to the left when the temperature of bulb 74 further increases is prevented.

*Operation*

Figure 4:
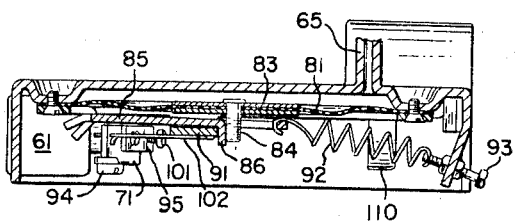
FIGURE 4 is a top view of the control device of FIGURE 2.

Assuming that the defrost control shown in FIGURES 2, 3, and 4 is connected in a system as shown in FIGURE 1, the system would operate normally to provide heat to space 10 as the air circulated through heating coil 12. The motor compressor which is shown in FIGURE 1 delivers hot gas to coil 12, and as the gas condenses heat is lost to the air, the liquid flows to coil 23 to evaporate by taking heat from the outdoor air. In order to remove heat from the outdoor air, the temperature of coil 23 is reduced below the air temperature, and if the air temperature is low, especially with a relatively high relative humidity, frost can form on coil 23. As frost forms on coil 23, the air flow through the coil as a result of the operation of fan 34 is cut down, and a reduction in pressure in space 64 takes place.

By the adjustment of screw 93 in FIGURE 2, pressure responsive device 63 is calibrated so diaphragm 81 holds member 83 and thus stop 86 inward when a predetermined reduction in the pressure in space 64 of FIGURE 1 takes place. By the association of the stop 86 of the hinged member 85 and the spring bias of member 83 outward as shown in FIGURE 2, the repeatability of the pressure responsive device 63 is greatly increased.

In the operation of a system such as shown in FIGURE 1, a small amount of frost on coil 23 can be tolerated; in fact, an amount of frost which does not restrict the air flow through the coil appreciably aids in the heat transfer of the heat from the air to the coil which increases the efficiency of the system. For best operation, the pressure in chamber 64 or pressure difference across the coil since the reference for pressure responsive device 63 is atmospheic pressure is quite critical. If latching device 70 operates when only a small amount of frost exists on coil 23 to result in a slight drop in the pressure in space 64, a premature defrost cycle is initiated. On the other hand, if the pressure must drop quite a bit in space 64 before the defrost control initiates the defrost operation, coil 23 may be restricted so much by the frost that a very low efficiency in the operation will exist for a period before the defrost cycle is started. By means of the novel pressure responsive device 63, stop 86 is pulled inward at a predetermined pressure difference across the diaphragm 81 depending upon the calibration as selected by screw 93 with a high degree of repeatability.

When coil 23 is warmer than 32° or above the temperature at which frost forms, the temperature responsive device 73 has an output so member 72 holds lever 71 in the position as shown in FIGURE 2. In the position shown, lever 71 maintains switch 61 closed by pushing on a spring loaded operating button 100. Since lever 71 is held to the left, blade 102 is not engaging stop 86, and even though the pressure in space 64 of FIGURE 1 drops to operate the pressure responsive device 63, the defrost cycle is not initiated. A drop in the pressure in space 64 might be brought about by a gust of wind or some other condition; therefore, the fact that the coil temperature is above 32° F. indicates that the drop in pressure in space 64 is not due to the presence of frost to restrict the air flow through coil 23. As soon as the temperature of coil 23 drops to a temperature at which frost forms, temperature responsive device 73 pulls in member 72, and lever 71 moves clockwise under the force of the spring loaded switch operating button 100 in a manner described with spring 76 in the schematic of FIGURE 1. Blade 102 then engages stop 86. As long as the pressure in space 64 is not low enough to cause operation of pressure responsive device 63, lever 71 is held in the first operating range and switch 61 is held closed. Upon the presence of frost on coil 23, the pressure in space 64 drops to cause stop 86 to pull inward so lever 71 can move to the left and switch 61 can open. When switch 61 opens, the defrost cycle is initiated by the energization of solenoid 40 as shown in FIGURE 1. Valve 22 is operated so member 24 is in the horizontal position and hot gas is delivered to coil 23. As the coil heats up and the frost is removed from the coil, bulb 74 is exposed to a higher temperature. The output of temperature responsive device 73 increases to move member 72 to the left and to reposition lever 71 to the first operating range to close switch 61 and to stop the defrost cycle.

While the apparatus has been described as associated with a system schematically shown in FIGURE 1, the apparatus could be used with various defrosting methods of a heat exchanger or coil 23; therefore, the invention is to limit the scope of the invention only by the appended claims in which I claim:

1. In a defrost control for a heat pump having a heat exchanger for removing heat from air which is drawn through the heat exchanger by a fan, a base member, pressure responsive means adapted to respond to the difference in pressure on the upstream side of the heat exchanger and the normal atmospheric pressure, a switch actuating lever pivotally mounted at a lower end of said base for movement in a plane parallel to said base, a stop member adapted to project above a portion of said base, means connecting said stop to said pressure responsive means to pull said stop behind said portion when said upstream pressure drops a predetermined amount below the atmospheric pressure, resilient means, means connecting said resilient means to said lever to bias said lever in a clockwise direction toward said stop, a switch, said switch being actuated by said lever when said lever is released to move in a clockwise direction beyond said stop, and temperature responsive means adapted to respond to the temperature of the heat exchanger, said temperature responsive means having an output member engaging said lever to move and hold said lever in a predetermined counter clockwise position when the temperature of the heat exchanger is above a frost forming temperature, said lever being free to move against said stop and beyond said stop if said stop is pulled behind said portion to said switch actuating position when the temperature of the heat exchanger is below said frost forming temperature.

2. In a defrost control for a heat pump having a heat exchanger for removing heat from air which flows through the heat exchanger under the power of a fan, a base member having a raised portion, pressure responsive means adapted to respond to the difference in pressure on one side of the heat exchanger and the normal atmospheric pressure, a switch actuating lever pivotally mounted at a lower end of said base for movement on said portion in a plane parallel to said base, said lever being biased in a clockwise direction, a stop member adapted to project above a portion of said base, means connecting said stop to said pressure responsive means to pull said stop behind said portion when said difference reaches a predetermined value, a switch, means connecting said lever to said switch to be actuated by said lever when said lever is released to move in a clockwise direction beyond said stop, and temperature responsive means adapted to respond to the temperature of the heat exchanger, said temperature responsive means having an output member engaging said lever to move and hold said lever in a predetermined counter clockwise position when the temperature of the heat exchanger is above a frost forming temperature, said lever being free to move against said stop and beyond said stop upon said difference being present to said switch actuating position when the temperature of the heat exchanger is below said frost forming temperature.

3. In a defrost control for a coil of a refrigeration system wherein an exchange of heat is obtained as air flows through the coil under the power of a fan, a base, a lever pivotally mounted for movement in a first and a second range in a plane parallel to said base, said lever being biased in a clockwise direction, a switch, means connecting said lever and said switch to actuate said switch when said lever is moved to said second range, a flexible diaphragm attached around its periphery to said base, said diaphragm being adapted to respond to a drop in pressure as the air flow through the coil decreases, a stop member connected to said diaphragm and pivotally attached to said base, said stop member being adapted to move inward perpendicular to said base when a less than normal pressure exists below said diaphragm due to a reduction in air flow through the coil, a platform attached to said base and spanning said diaphragm parallel to said base, an adjustable spring, said spring being connected to said stop member to urge said member forward away from said base toward said platform, said stop member having a portion normally extending beyond said platform, a blade member attached to a free extremity of said lever, said blade member adapted to slide on said platform so an edge of said blade engages said portion when extended beyond said platform, said lever being limited in a first range of movement by said portion when normal air flow exists through the coil, an operator having a mechanical output member the position of which depending upon the temperature of a temperature sensor adapted to respond to the coil temperature, means connecting said operator to said base so said output member can change the position of said lever, said output member limiting the movement of said lever to said first range when the coil temperature is substantially above 32° F.

4. In a defrost control for a coil of a refrigeration system wherein an exchange of heat is obtained as air flows through the coil under the power of a fan, a base, a lever pivotally mounted on said base for movement in a first and a second range, said lever being biased for movement to said second range, a switch, means connecting said lever and said switch to actuate said switch when said lever is moved to said second range, a pressure responsive means adapted to respond to air flow through the coil, a support member connected to said pressure responsive means and pivotally attached to said base, said support member being adapted to pivot about said base when a pressure indicative of a less than normal air flow exists at said pressure responsive means, a platform attached to said base, an adjustable tension means, said tension means being connected to said support member to urge said support member against said platform, a stop member attached to said support member normally extending beyond said platform, a flat member attached to a free extremity of said lever, said flat member adapted to slide on said platform so an edge of said flat member engages said stop when said stop is extended beyond said platform, said lever being limited in a first range of movement by said stop when normal air flow exists through the coil, an operator having a mechanical output member, temperature responsive means having an output member with a position depending upon the temperature of the coil, means connecting said output member to change the position of said lever, said output member determining the movement of said lever in one or both of said ranges depending on the temperature of the coil.

5. In a control device, a base, a lever pivotally mounted on said base for movement in a first and a second range, said lever being spring biased for movement to said second range, a switch, means connecting said lever and said switch to actuate said switch when said lever is moved to said second range, a pressure responsive means adapted to respond to a predetermined pressure, a support member connected to said pressure responsive means and pivotally attached to said base, a platform attached to said base, an adjustable tension means, said tension means being connected to said support member to urge said support member against an under side of said platform, a stop member attached to said support member and normally extending beyond said platform, a flat member attached to a free extremity of said lever and biased against said platform, said flat member adapted to slide on said platform so an edge of said flat member engages said stop when said stop is extended beyond a front side of said platform, said lever being limited in a first range of movement by said stop, an operator having a mechanical output member, a temperature responsive means, means connecting said temperature responsive means to said operator to position said output member depending upon the temperature of said temperature responsive means, means connecting said operator to said base so said output member can change the position of said lever, said output member determining the movement of said lever in one or both of said ranges depending on the temperature of said responsive means.

6. In a defrost control device for a refrigeration system having an outdoor heat exchanger which has outdoor air passing therethrough upon the operation of a fan, a base, a lever pivotally mounted on said base, said lever being spring biased for movement from a first to a second position, a switch adapted to initiate a defrosting operation of said outdoor heat exchanger, means connecting said lever to actuate said switch when said lever is in said second position, a pressure responsive means adapted to respond to a predetermined pressure indicative of an air pressure drop across the heat exchanger due to the formation of a predetermined amount of frost thereon, a first member connected to said pressure responsive means and pivotally attached to said base, resilient means, means connecting said resilient means to bias said first member in a first direction, a stop member associated with said first member, a free end of said lever contacting said stop to hold said lever in said first position so that said lever is released when said predetermined pressure exists, temperature responsive means responsive to the temperature of said heat exchanger, means connecting said temperature responsive means to said lever to prevent said lever from moving to said second position when a predetermined heat exchanger temperature exists.

7. In a defrost control device for a refrigeration system having an outdoor heat exchanger whcih has outdoor air passing therethrough upon the operation of a fan, a base, a lever pivotally mounted on said base, said lever being spring biased for movement from a first to a second position, a switch, means connecting said lever to actuate said switch to start a defrost heating operation of said outdoor heat exchanger when said lever is in said second position, a pressure responsive means adapted to respond to a predetermined pressure indicative of a pressure drop across the heat exchanger due to the formation of a predetermined amount of frost thereon, a first member connected to said pressure responsive means and pivotally attached to said base, resilient means, means connecting said resilient means to bias said first member in a first direction, a stop member associated with said first member, a free end of said lever contacting said stop to hold said lever in said first position whereby said lever is released when said predetermined pressure exists, temperature responsive means responsive to the temperature of said heat exchanger, means connecting said temperature responsive means to said lever to move said lever from said second position to said first position when said heat exchanger is heated above a selected high temperature during said defrost operation.

8. In a defrost control device for a refrigeration system having a fan for moving outdoor air through a heat exchanger, a base, a lever pivotally mounted on said base for movement in a first and a second range, said lever being spring biased for movement from said first range to said second range, a switch adapted to initiate a defrost cycle of the heat exchanger, means connecting said lever and said switch to actuate said switch to start a defrost cycle when said lever is moved to said second range, a pressure responsive means adapted to respond to a predetermined air pressure drop across the heat exchanger, a first member connected to said pressure responsive means and pivotally attached to said base, resilient means, means connecting said resilient means to bias said first member in a first direction, a stop member, a free end of said lever contacting said stop to hold said lever in said first range, means including said first member for rending said stop ineffective so as to release said lever when a predetermined pressure drop exists across said heat exchanger, temperature responsive means having an output member, said temperature responsive means positioning said output member depending upon the temperature of said temperature responsive means, means connecting said output member between said base and said lever so that said lever is held in said first position when said heat exchanger temperature is above 32° F. and said lever is moved to said first position when said heat exchanger is heated from a temperature below 32° F. to a temperature above 32° F. to terminate said defrost cycle.

References Cited in the file of this patent
UNITED STATES PATENTS

| | | |
|---|---|---|
| 2,728,197 | Ellenberger | Dec. 27, 1955 |
| 2,744,389 | Raney | Mar. 8, 1956 |
| 2,801,524 | Fifield | Aug. 6, 1957 |